(12) United States Patent
Bogineni et al.

(10) Patent No.: US 11,743,772 B2
(45) Date of Patent: Aug. 29, 2023

(54) SYSTEMS AND METHODS FOR DIFFERENTIATED TRAFFIC TREATMENT FOR DIFFERENT TRAFFIC TYPES ASSOCIATED WITH MULTI-PERSONA APPLICATIONS

(71) Applicant: Verizon Patent and Licensing Inc., Basking Ridge, NJ (US)

(72) Inventors: Kalyani Bogineni, Irving, TX (US); Deepa Jagannatha, Bridgewater, NJ (US); Sudhakar Reddy Patil, Westlake, TX (US); Ratul K. Guha, Warwick, PA (US); Luay Jalil, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/358,257

(22) Filed: Jun. 25, 2021

(65) Prior Publication Data
US 2022/0417794 A1 Dec. 29, 2022

(51) Int. Cl.
*H04W 28/08* (2023.01)
*H04W 28/02* (2009.01)
*H04W 80/06* (2009.01)
*H04W 28/082* (2023.01)

(52) U.S. Cl.
CPC ... *H04W 28/0992* (2020.05); *H04W 28/0268* (2013.01); *H04W 28/085* (2013.01); *H04W 28/0967* (2020.05); *H04W 80/06* (2013.01)

(58) Field of Classification Search
CPC ......... H04W 28/0992; H04W 28/0268; H04W 28/085; H04W 28/0967; H04W 80/06
See application file for complete search history.

(56) References Cited

U.S. PATENT DOCUMENTS

| 2015/0304883 | A1* | 10/2015 | Tabet | H04L 47/32 370/238 |
| 2021/0274575 | A1* | 9/2021 | Talebi Fard | H04W 76/12 |
| 2022/0086938 | A1* | 3/2022 | Qiao | H04W 76/11 |

(Continued)

OTHER PUBLICATIONS

3GPP TS 23.501 V17.1.1 (Jun. 2021), "3rd Generation Partnership Project; Technical Specification Group Services and System Aspects; System architecture for the 5G System (5GS); Stage 2 (Release 17)," Jun. 2021.

(Continued)

*Primary Examiner* — Omer S Mian

(57) ABSTRACT

A system described herein may provide a technique for the differentiated Quality of Service ("QoS") treatment of different traffic types associated with the same application (e.g., a "multi-persona" application) by a wireless network, without the exposure of an application identifier of the application to the wireless network. The application may provide a traffic type indication, based on which a User Equipment ("UE") may establish one or more QoS flows or other types of communication sessions with the wireless network, where the QoS flows or other types of communication sessions are associated with a network slice that is associated with the traffic type. The communication sessions may include Data Radio Bearers ("DRBs"), backhaul links, protocol data unit ("PDU") sessions, or other suitable types of communication sessions.

20 Claims, 9 Drawing Sheets

(56) References Cited

U.S. PATENT DOCUMENTS

2022/0295585 A1* 9/2022 Salkintzis ............. H04W 12/03
2022/0385571 A1* 12/2022 Dhammawat ......... H04L 45/566

OTHER PUBLICATIONS

3GPP TS 23.502 V17.1.0 (Jun. 2021), "3rd Generation Partnership Project; Technical Specification Group Services and System Aspects; Procedures for the 5G System (5GS); Stage 2 (Release 17)," Jun. 2021.

3GPP TS 23.503 V17.1.0 (Jun. 2021), "3rd Generation Partnership Project; Technical Specification Group Services and System Aspects; Policy and charging control framework for the 5G System (5GS); Stage 2 (Release 17)," Jun. 2021.

* cited by examiner

SYSTEMS AND METHODS FOR DIFFERENTIATED TRAFFIC TREATMENT FOR DIFFERENT TRAFFIC TYPES ASSOCIATED WITH MULTI-PERSONA APPLICATIONS

BACKGROUND

Wireless user equipment ("UE"), such as mobile telephones or other wireless communication devices, may execute applications associated with services such as voice call services, content streaming services, file download services, or the like. A wireless network may provide different Quality of Service ("QoS") treatment to different applications in order to provide a satisfactory user experience for particular applications.

DETAILED DESCRIPTION OF EXAMPLE EMBODIMENTS

The following detailed description refers to the accompanying drawings. The same reference numbers in different drawings may identify the same or similar elements.

Wireless networks may provide mechanisms whereby different Quality of Service ("QoS") levels are provided to traffic associated with different applications. Such treatment may include the use of particular discrete sets of network functions associated with a wireless network (e.g., network slices), queuing parameters, resource allocation parameters, and/or other QoS-related parameters in order to provide a threshold measure of performance for the traffic based on the application with which the traffic is associated.

As described herein, some applications may be "multi-persona" applications, which may be associated with different services and/or traffic types. For example, a given multi-persona application may be associated with a voice call service, a content streaming service, and a file transfer service. As such, the multi-persona application may send and/or receive voice call traffic, content streaming traffic, and/or file transfer traffic to and/or from a network. Embodiments described herein provide mechanisms by which the different traffic types associated with a multi-persona application may be provided with granular, differentiated QoS treatment (e.g., per-traffic type QoS treatment) based on traffic type. In this manner, traffic associated with multi-persona applications may be provided in a manner that provides at least a threshold measure of performance on a per-traffic type basis. Further, such embodiments may make more efficient use of network resources, as providing appropriate QoS treatment to some traffic types associated with a multi-persona application may consume less network resources than providing QoS treatment to other traffic types associated with the multi-persona application.

Figure 1:
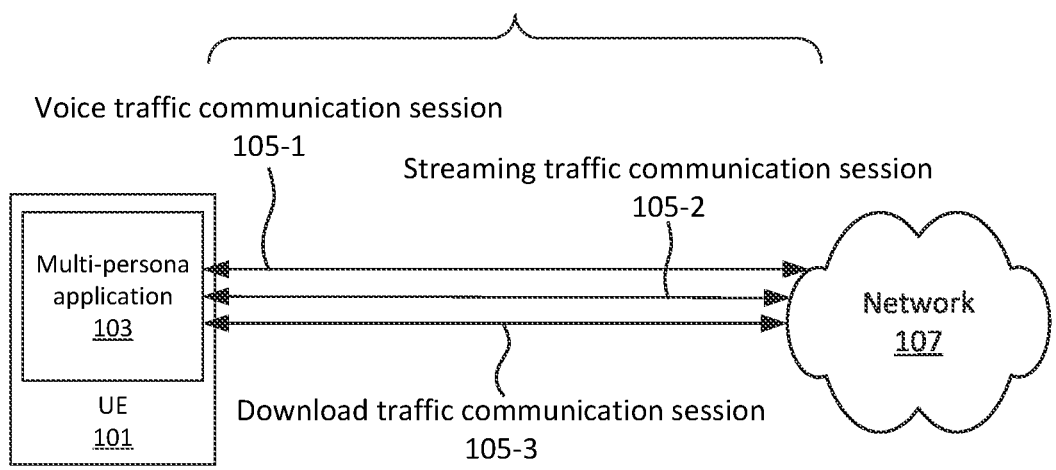
FIGS. 1 and 2 illustrate an example overview of one or more embodiments described herein.

As shown in FIG. 1, for example, UE 101 may execute multi-persona application 103. In this example, multi-persona application 103 may provide voice call services, content streaming services, and file transfer (e.g., "download" and/or "upload") services. As such, as described herein, embodiments may provide for the establishment of multiple communication sessions 105 between UE 101 and network 107, where such communication sessions 105 are associated with traffic to and/or from multi-persona application 103. For example, communication session 105-1 may be associated with voice traffic sent to and/or from multi-persona application 103, communication session 105-2 may be associated with streaming traffic sent to and/or from multi-persona application 103, and communication session 105-3 may be associated with file transfer traffic sent to and/or from multi-persona application 103. As described herein, communication sessions 105 may include, and/or may refer to, one or more different types of communication sessions at different layers of a network model, such as a Data Radio Bearer ("DRB"), an Internet Protocol ("IP")-based communication session, a protocol data unit ("PDU") session, a QoS flow, a General Packet Radio Service ("GPRS") Tunneling Protocol ("GTP") tunnel, and/or other types of communication sessions.

Each communication session 105 may be associated with different QoS parameters, and may be accordingly treated, prioritized, processed, etc. differently by network 107. For example, network 107 may include a RAN and a core network, which may each include network elements with QoS enforcement mechanisms. For example, the RAN may allocate differentiated sets or amounts of radio frequency ("RF") resources, such as Physical Resource Blocks ("PRBs"), for different communication sessions 105 (e.g., for different DRBs). As another example, the RAN and/or core network may utilize different priorities, queue weights, etc. for different communication sessions 105. In some embodiments, the RAN and/or core network may include different sets of network functions or other differentiated treatment (e.g., via different network slices) for different communication sessions 105. In this manner, different types of traffic may be provided with different QoS treatment, even though the different types of traffic are associated with the same application. Further, network 107 may provide such differentiated QoS treatment without inspecting or analyzing contents of the traffic (e.g., to determine a traffic type), thus mitigating or eliminating privacy concerns that may be raised by the analysis of traffic contents.

Figure 2:
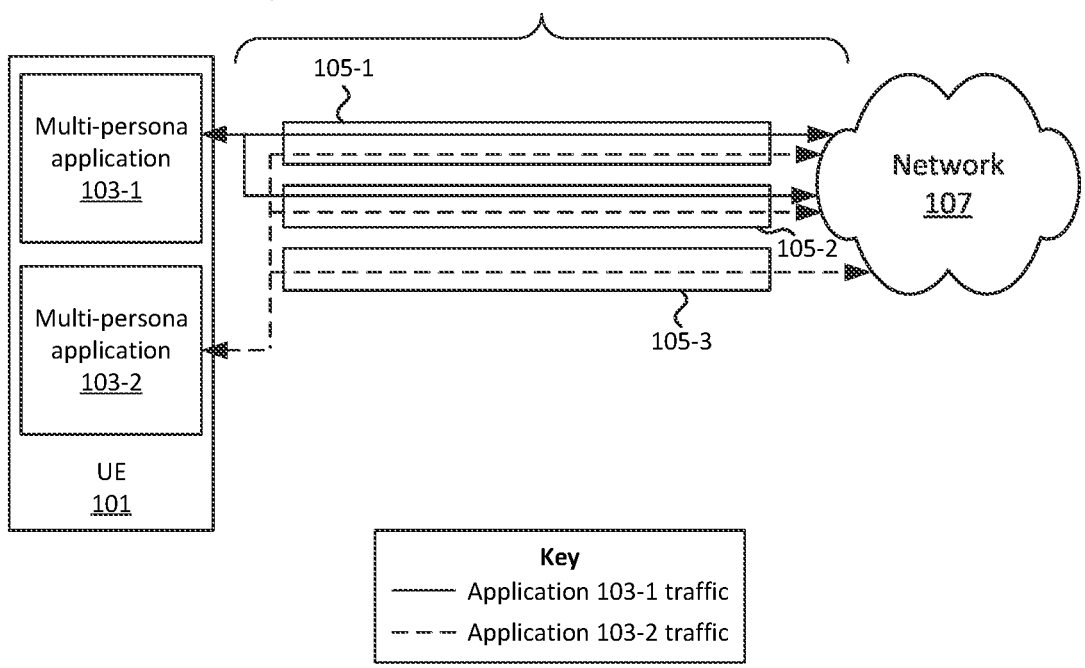

FIG. 2 illustrates an example of multiple multi-persona applications 103, executing at UE 101, associated with a set of communication sessions 105 between UE 101 and network 107. For example, as shown, UE 101 may execute multi-persona application 103-1 and multi-persona application 103-2, which may each be associated with multiple different traffic types. UE 101 may further be communicatively coupled to network 107 via multiple communication sessions 105-1, 105-2, and 105-3. Each communication session 105 may be associated with one or more traffic types associated with multi-persona applications 103-1 and 103-2. For example, multi-persona application 103-1 may send and/or receive traffic via communication sessions 105-1 and 105-2, while multi-persona application 103-2 may send and/or receive traffic via communication sessions 105-1, 105-2, and 105-3. Thus, the same communication session 105 may be used for multiple different multi-persona applications 103 (or other types of applications, which may include applications that are associated with a single traffic type and/or for which different QoS treatment for different traffic types is not provided).

Figure 3:
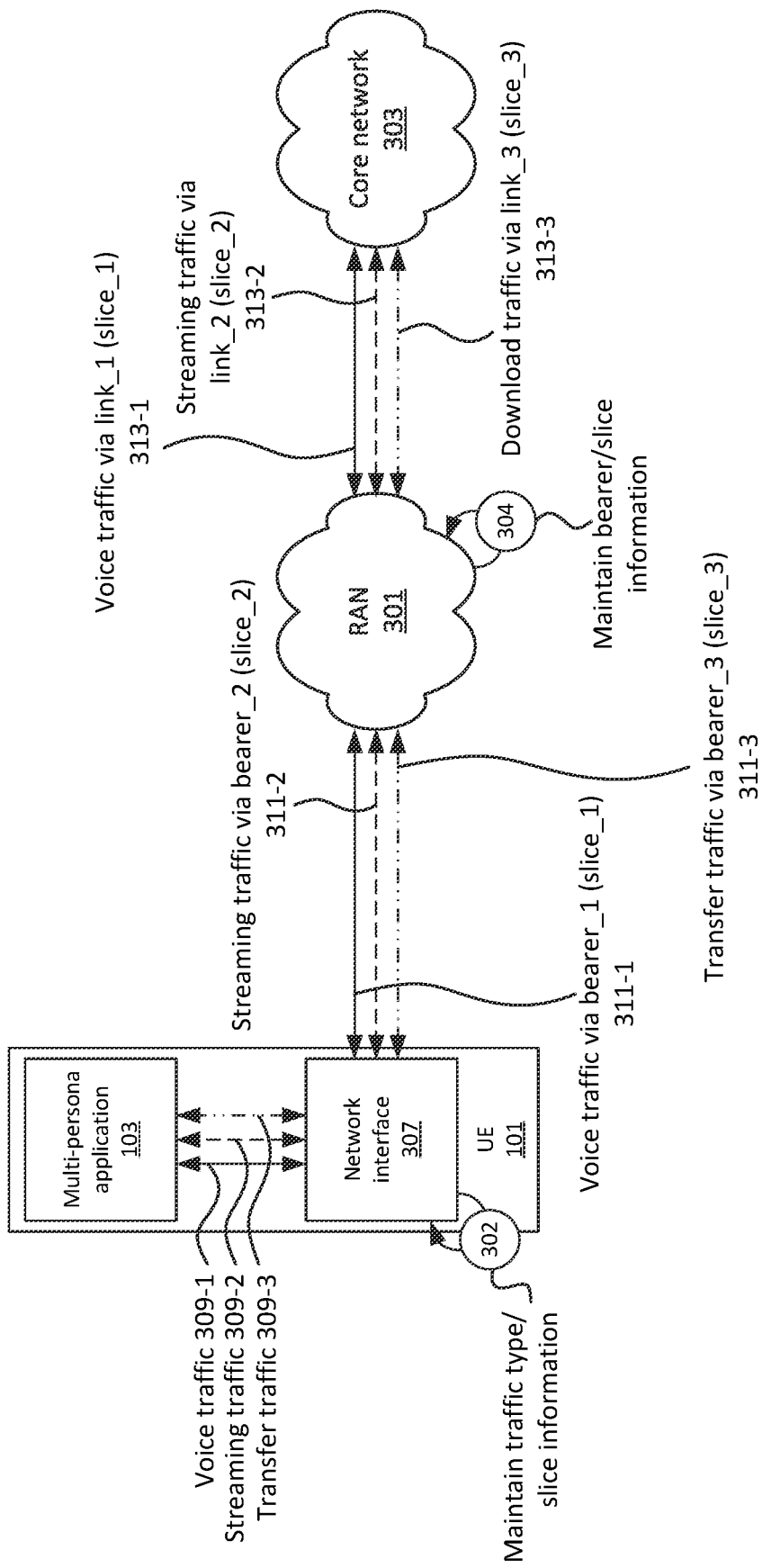
FIG. 3 illustrates an example arrangement of multiple communication sessions, with different QoS parameters, for a multi-persona application, in accordance with some embodiments.

As noted above, communication sessions 105 may include and/or may be associated with different types of communication sessions associated with different network elements and/or at different layers or protocols. FIG. 3 illustrates an example arrangement of multiple communication sessions 105, with different QoS parameters, via which multi-persona application 103 may communicate with one or more networks, such as RAN 301 and/or core network 303.

As shown, for example, UE 101 may execute multi-persona application 103, and may further include network interface 307. Network interface 307 may include wireless circuitry and/or logic to wirelessly communicate with RAN 301. For example, network interface 307 may include and/or may be communicatively coupled to one or more antennas or other wireless circuitry via which UE 101 may communicate with a base station or other wireless network infrastructure of RAN 301. In some embodiments, network interface 307 may include and/or may be communicatively coupled to one or more modems or other types of network interfaces that operate to output network traffic to RAN 301 based on application traffic received from multi-persona application 103, as well as to provide application traffic to multi-persona application 103 based on network traffic received from RAN 301. Network interface 307 may be implemented by or may be communicatively coupled to an operating system of UE 101 or other lower-layer functionality of UE 101 (e.g., via one or more application programming interfaces ("APIs") or other suitable communicate pathways.

In some embodiments, network interface 307 may maintain and/or otherwise receive (at 302) information that correlates different traffic types to network slices associated with RAN 301 and/or core network 303. For example, traffic types may be associated with names, categories, profiles, and/or other suitable identifiers. Slices may be denoted by Network Slice Selection Assistance Information ("NSSAI") values or other suitable identifiers. Network interface 307 may receive the information, correlating traffic types to network slices, as part of an initial provisioning process associated with UE 101, as part of an Over-the-Air ("OTA") update, or some other suitable procedure. UE 101 may store such information in read-only memory ("ROM"), a Universal Integrated Circuit Card ("UICC"), or some other secure storage location.

Multi-persona application 103 may communicate different types of traffic 309, such as voice traffic 309-1, streaming traffic 309-2, and transfer traffic 309-3 (e.g., file transfer traffic, such as file upload and/or download traffic), with one or more devices or systems (e.g., application servers, content provider systems, or the like) via RAN 301, core network 303, and/or one or more other networks (e.g., the Internet). For example, multi-persona application 103 may provide such traffic 309 to network interface 307 via one or more APIs or other suitable communication pathways, and may receive traffic 309 from network interface 307. Thus, network interface 307 may handle the reception and/or transmission of traffic 309 to and/or from UE 101, which may include the establishment of communication sessions with RAN 301 and/or elements of core network 303, as described further herein.

For example, multi-persona application 103 may output a request to network interface 307 to forward voice traffic 309-1, and/or may otherwise indicate outgoing voice traffic 309-1. In outputting such a request or indication, multi-persona application 103 may indicate a type of traffic to be output (e.g., "voice traffic" in this example). In some embodiments, multi-persona application 103 may indicate traffic types to network interface 307 without providing an application identifier associated with multi-persona application 103. In this manner, privacy of a user associated with UE 101 may be preserved, in that particular applications (such as multi-persona application 103) may not be indicated to RAN 301, core network 303, and/or other sources when providing differentiated QoS as described herein for different traffic types associated with multi-persona application 103.

Network interface 307 may identify (e.g., based on the maintained (at 302) traffic type/slice information) a particular network slice associated with the requested traffic type, and may establish one or more communication sessions with RAN 301 based on the identified network slice. Additionally, or alternatively, network interface 307 may identify one or more previously established communication sessions between UE 101 and RAN 301 that correspond to the identified network slice. For example, network interface 307 and RAN 301 may establish one or more DRBs according to the network slice, and/or network interface 307 may identify a previously established DRB according to the network slice (e.g., where different DRBs may be associated with different network slices, and/or where each DRB may be associated with multiple network slices). Additionally, or alternatively, network interface 307 may establish a QoS flow between UE 101 and RAN 301, and/or may identify a previously established QoS flow between UE 101 and RAN 301 that corresponds to the identified network slice. In some embodiments, a DRB may be associated with a particular QoS flow. In some embodiments, a DRB may be associated with multiple QoS flows. Similarly, network interface 307 may establish or identify respective communication sessions between UE 101 and RAN 301 for streaming traffic 309-2 and transfer traffic 309-3 associated with multi-persona application 103.

Thus, as shown, UE 101 may communicate with RAN 301 via (e.g., network interface 307 may establish or identify) bearers 311, which may each be or include DRBs and/or QoS flows. In some embodiments, each bearer 311 may be associated with a different network slice, which may be selected based on the traffic type/slice information maintained (at 302) by network interface 307.

For example, bearer 311-1 may be associated with a first network slice ("slice 1"), bearer 311-2 may be associated with a second network slice ("slice 2"), and bearer 311-3 may be associated with a third network slice ("slice 3"). As such, when receiving voice traffic 309-1 from multi-persona application 103, network interface 307 may output such traffic to RAN 301 via bearer 311-1. Similarly, when receiving streaming traffic 309-2 from multi-persona application 103, network interface 307 may output such traffic to RAN 301 via bearer 311-2. Further, when receiving transfer traffic 309-3 from multi-persona application 103, network interface 307 may output such traffic to RAN 301 via bearer 311-3. As noted above, bearers 311 may include one or more DRBs, QoS flows, and/or other types of suitable communication sessions between 301 that are associated with particular network slices.

RAN 301 may further maintain (at 304) bearer/slice information, which may indicate particular network slices that correspond to particular bearers 311. For example, one or more base stations and/or other suitable devices or systems of RAN 301 may maintain such information. RAN 301 may utilize such information when outputting traffic to UE 101 via one or more bearers 311. For example, RAN 301 may receive traffic (e.g., from core network 303) via a given network slice, and may identify (based on the maintained (at 304) bearer/slice information) via which particular bearer 311 the traffic should be provided to UE 101.

Additionally, RAN 301 may utilize the bearer/slice information when forwarding traffic from UE 101 to core network 303. For example, RAN 301 may establish (e.g., via an N3 interface or other suitable interface) one or more communication sessions with one or more elements of core network 303, such as a User Plane Function ("UPF") or other suitable device or system. Such communication sessions may include backhaul links, QoS flows, GTP tunnels (e.g., GTP-U tunnels), or other suitable communication sessions (referred to in FIG. 3 as "links" 313). In some embodiments, links 313-1, 313-2, and 313-3 may be implemented by the same physical infrastructure (e.g., the same fiber links or other types of communication pathways). In some embodiments, one or more of links 313-1, 313-2, and/or 313-3 may be implemented by different physical infrastructure. Different QoS flows, GTP tunnels, or the like may be associated with different network slices. In some embodiments, a particular GTP tunnel or other link 313 may be associated with multiple QoS flows. For example, different traffic carried by a given GTP tunnel may include different QoS Flow Identifier ("QFI") values, which may each be associated with different network slices and, accordingly, different QoS parameters.

For example, as shown, a first link 313-1 may be associated with a first network slice (e.g., associated with the same network slice as bearer 311-1), a second link 313-2 may be associated with a second network slice (e.g., associated with the same network slice as bearer 311-2), and a third link 313-3 may be associated with a third network slice (e.g., associated with the same network slice as bearer 311-3). As links 313 are associated with different network slices, links 313 may accordingly be associated with different QoS parameters. As such, differentiated QoS treatment may be provided to different types of traffic 309 associated with multi-persona application 103 at both the RAN level (e.g., via bearers 311) and at the backhaul level (e.g., via links 313).

Further, as described further below, higher layer communication sessions, such as IP-based communication sessions, PDU sessions, etc., may be carried via communication sessions (e.g., DRBs, QoS flows, etc.) between UE 101 and RAN 301 and further via communication sessions (e.g., GTP-U tunnels, QoS flows, etc.) between RAN 301 and core network 303. As described below, different PDU sessions (or other types of communication sessions) may also be established for different traffic types for the same multi-persona application 103, thus serving to provide an appropriate level of performance associated with the different traffic types and/or services associated with multi-persona application 103.

Network interface 307 may, for example, receive application traffic from multi-persona application 103 (e.g., which may include an identifier of traffic type associated with the application traffic), identify a network slice associated with the application traffic (e.g., associated with the traffic type of the application traffic), and output the application traffic to RAN 301 via an appropriate bearer associated with the network slice. Additionally, or alternatively, network interface 307 may include QoS information with the traffic when outputting the traffic to RAN 301, such as by including a QFI value or other value that is associated with the network slice, in header information of the traffic. In this manner, the traffic may be transported to or via RAN 301 and/or core network 303 with QoS parameters that are based on the traffic type of the application traffic.

Figure 4:
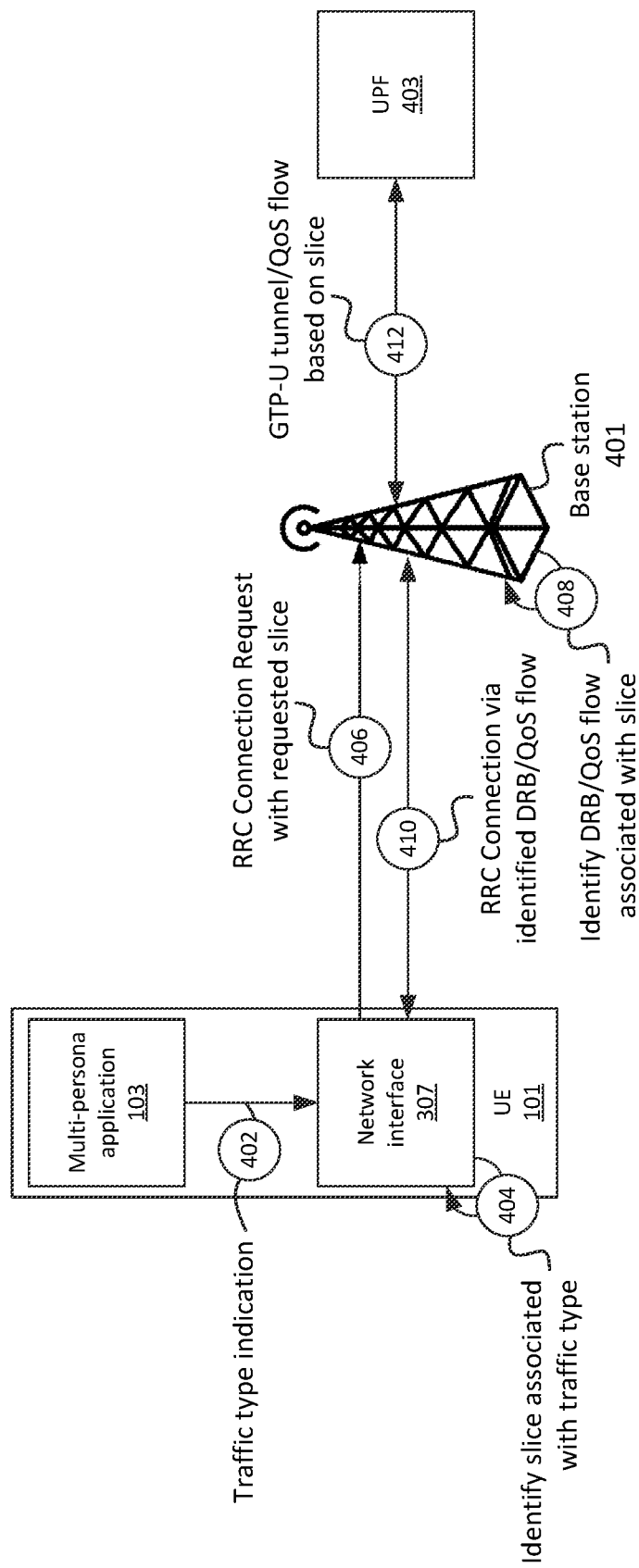
FIG. 4 illustrates an example establishment of one or more radio access network ("RAN") communication sessions and/or backhaul communication sessions for particular traffic types associated with a multi-persona application, in accordance with some embodiments.

FIG. 4 illustrates an example of establishing communication sessions between UE 101 and RAN 301 as well as between RAN 301 and core network 303 based on different traffic types associated with multi-persona application 103. For example, as shown, multi-persona application 103 may output (at 402) a traffic type indication to network interface 307. The traffic type indication may be or may include an initial communication associated with a particular traffic type, and/or may be a request to establish a communication session for the particular traffic type before any user plane traffic is sent from multi-persona application 103. The traffic type indication may include a name, category, or other type of identifier associated with the traffic type. In some embodiments, the traffic type indication may omit or otherwise not include an identifier of multi-persona application 103 itself, thus maintaining anonymity of multi-persona application 103.

In some embodiments, multi-persona application 103 may utilize a different endpoint identifier, such as a different IP address, for each different traffic type. In such embodiments, a discrete communication session (or set of communication sessions, such as bearer 311 and/or link 313) may be associated with each IP address (or other endpoint identifier). In such embodiments, a separate PDU session (or other higher layer communication session) may be associated with each separate IP address or other endpoint identifier.

In some embodiments, multi-persona application 103 may utilize the same endpoint identifier, such as the same IP address, for multiple different traffic types. In such embodiments, one or more communication sessions (or sets of communication sessions, such as bearer 311 and/or link 313) may be associated with the same IP address. For example, one DRB or other type of bearer may include multiple QoS flows associated with multi-persona application 103, where each QoS flow is associated with a different traffic type associated with multi-persona application 103. In such embodiments, the same PDU session may be associated with the same IP address of multi-persona application 103. The same PDU session may include multiple QoS flows (e.g., as denoted by QFI values or other suitable values in header information of traffic) that are each associated with a particular traffic type associated with multi-persona application 103.

Network interface 307 may further identify (at 404) a network slice associated with the requested traffic type. For example, as discussed above, network interface 307 may maintain information correlating particular traffic types with particular network slices. UE 101 may output (at 406) a request to establish one or more communication sessions associated with the identified network slice to RAN 301, such as to base station 401 of RAN 301. For example, base station 401 may be a base station to which UE 101 is already connected, and/or to which UE 101 is within communication range but is not already connected. The request may be or may include a Radio Resource Control ("RRC") Connection Request or other suitable type of request. The request may further indicate the requested network slice.

Base station 401 may identify (at 408) a DRB (and/or some other type of bearer or QoS flow) associated with the requested slice, and/or may identify parameters for a DRB associated with the requested slice. For example, base station 401 may identify one or more existing DRBs, between UE 101 and base station 401, that are associated with the requested slice. In the event that no such DRBs exist, base station 401 may initiate the creation of one or more DRBs with parameters matching the requested slice. For example, base station 401 may maintain information that maps parameters of DRBs (e.g., queueing parameters, RF resource parameters, etc.) with different network slice identifiers.

Base station 401 and UE 101 (e.g., via network interface 307) may communicate (at 410) to establish the one or more DRBs associated with the network slice. Additionally, or alternatively, in the event that such DRBs flows already exist between UE 101 and base station 401, base station 401 may indicate which existing DRB corresponds to the requested network slice. Network interface 307 may subsequently proceed to output traffic, associated with the particular traffic type, via the DRB indicated by base station 401 as associated with the traffic type. That is, network interface 307 may output traffic, associated with the particular traffic type and received from multi-persona application 103 and/or some other application, via the DRB.

Base station 401 may further establish and/or identify one or more GTP-U tunnels, QoS flows, or other suitable types of communication sessions (e.g., via an N3 interface) with UPF 403 based on the network slice indicated (at 402) by multi-persona application 103. For example, base station 401 may identify (at 412) an existing GTP-U tunnel and/or QoS flow between base station 401 and UPF 403 that is associated with the network slice, and/or may establish (at 412) a GTP-U tunnel and/or QoS flow between base station 401 and UPF 403 that is associated with the network slice. As mentioned above, in some embodiments, a particular GTP-U tunnel may include multiple QoS flows, or may include a single QoS flow.

As such, when receiving traffic via a particular DRB or QoS flow from UE 101 (e.g., traffic that has been provided by network interface 307 via the particular DRB or QoS flow based on network interface 307 identifying that the traffic is associated with a particular traffic type), base station 401 may identify a network slice associated with the DRB or QoS flow and may forward the traffic to UPF 403 via a GTP-U tunnel or QoS flow associated with the same network slice. Similarly, when receiving traffic via a particular GTP-U tunnel or QoS flow from UPF 403, base station 401 may identify a network slice associated with the GTP-U tunnel or QoS flow (e.g., based on QFI values associated with the traffic and/or in some other suitable manner) and may forward the traffic to UE 101 via a DRB or QoS flow associated with the same network slice. Network interface 307 may proceed to forward the traffic to multi-persona application 103.

Figure 5:
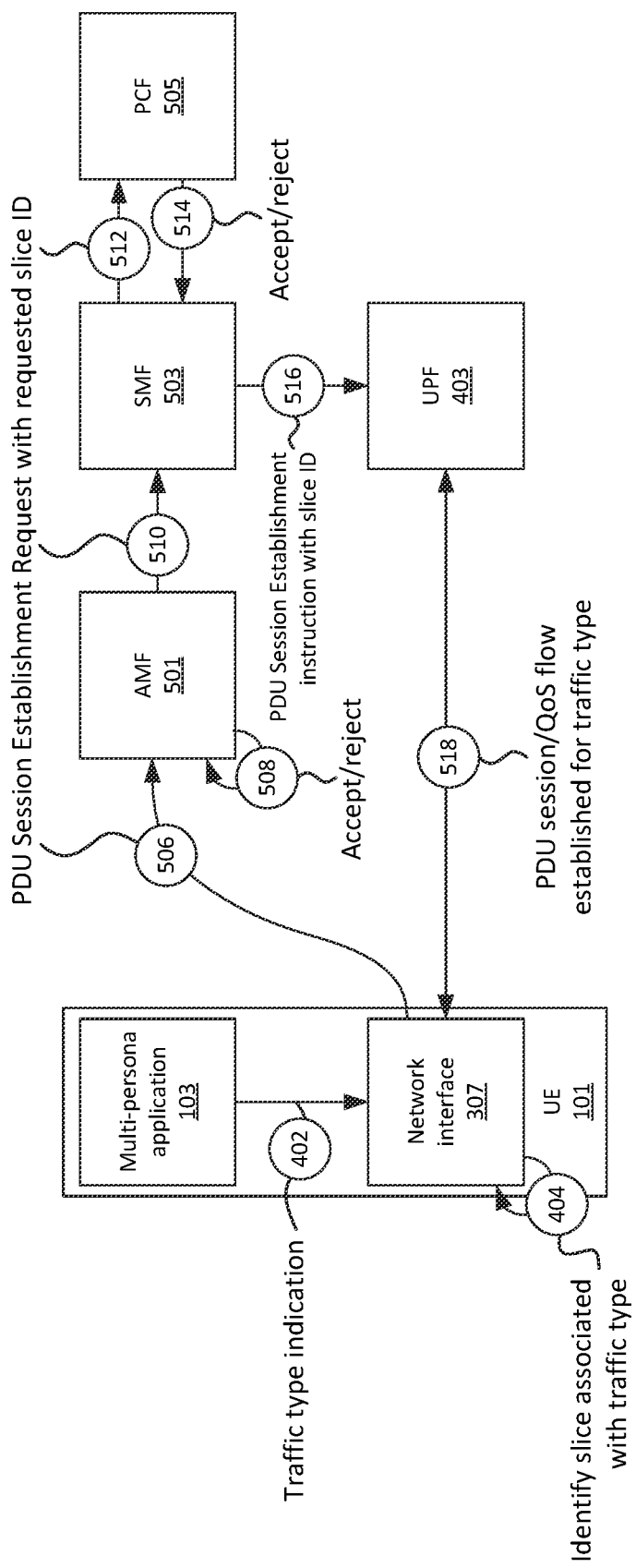
FIG. 5 illustrates an example establishment of one or more communication sessions between a User Equipment ("UE") and elements of a core network for particular traffic types associated with a multi-persona application, in accordance with some embodiments.

FIG. 5 illustrates an example of a higher layer session establishment for a given traffic type (e.g., a particular traffic type out of a set of traffic types associated with multi-persona application 103). As similarly shown in FIG. 4, network interface 307 may receive (at 402) a traffic type indication from multi-persona application 103, and may identify (at 404) a network slice associated with the traffic type. Multi-persona application 103 may further output (at 506) a communication session establishment request, in order to establish a PDU session or other type of communication session with UPF 403 or other suitable function of core network 303. Such communication session may be a higher layer than the communication sessions shown in FIG. 4 (e.g., sessions between UE 101 and base station 401, and between base station 401 and UPF 403), and may, in some embodiments, be carried by the communication sessions shown in FIG. 4.

As shown, for example, UE 101 (e.g., network interface 307) may output (at 506) a PDU Session Establishment Request to Access and Mobility Management Function ("AMF") 501. The PDU Session Establishment Request may include an indication of the slice associated with the traffic type (e.g., as identified by network interface 307). AMF 501 may accept or reject (at 508) the request for the network slice to be used for the PDU session. For example, AMF 501 may determine whether a subscription associated with UE 101 indicates whether the particular network slice is authorized for UE 101, and/or may accept or reject the request based on other factors. In this example, assume that AMF 501 determines (at 508) that UE 101 is authorized to use the requested network slice, and therefore accepts (at 508) the PDU Session Establishment Request.

AMF 501 may further forward (at 510) the PDU Session Establishment Request to Session Management Function ("SMF") 503. SMF 503 may output (at 512) a policy request to Policy Control Function ("PCF") 505. The policy request may include an identifier of UE 101, an identifier of the requested slice, and/or other suitable information. PCF 505 may identify one or more policies, which may be generated or determined based on other factors (e.g., network load and/or other suitable factors). PCF 505 may provide (at 514) an indication of whether the PDU Session Establishment Request should be accepted or rejected based on the policies, and/or may provide (at 514) such policies to SMF 503 based on which SMF 503 may accept or reject the request.

In this example, assume that UE 101 is authorized to use the requested network slice (e.g., based on subscription information associated with UE 101 and/or based on one or more policies determined or provided by PCF 505). Accordingly, SMF 503 may output (at 516) an instruction to UPF 403 to establish a PDU session, according to the requested network slice, with UE 101. UPF 403 may accordingly communicate with UE 101 (e.g., via network interface 307) to establish (at 518) a PDU session and/or QoS flow associated with the requested network slice. In some embodiments, a PDU session may be associated with multiple QoS flows. In some scenarios, UPF 403 may identify an existing PDU session that is associated with the determined network slice, and may communicate with UE 101 via the existing PDU session. In some embodiments, UPF 403 may identify an existing QoS flow between UPF 403 and UE 101 (e.g., associated with a particular PDU session) and may communicate with UE 101 via the existing QoS flow.

Figure 6:
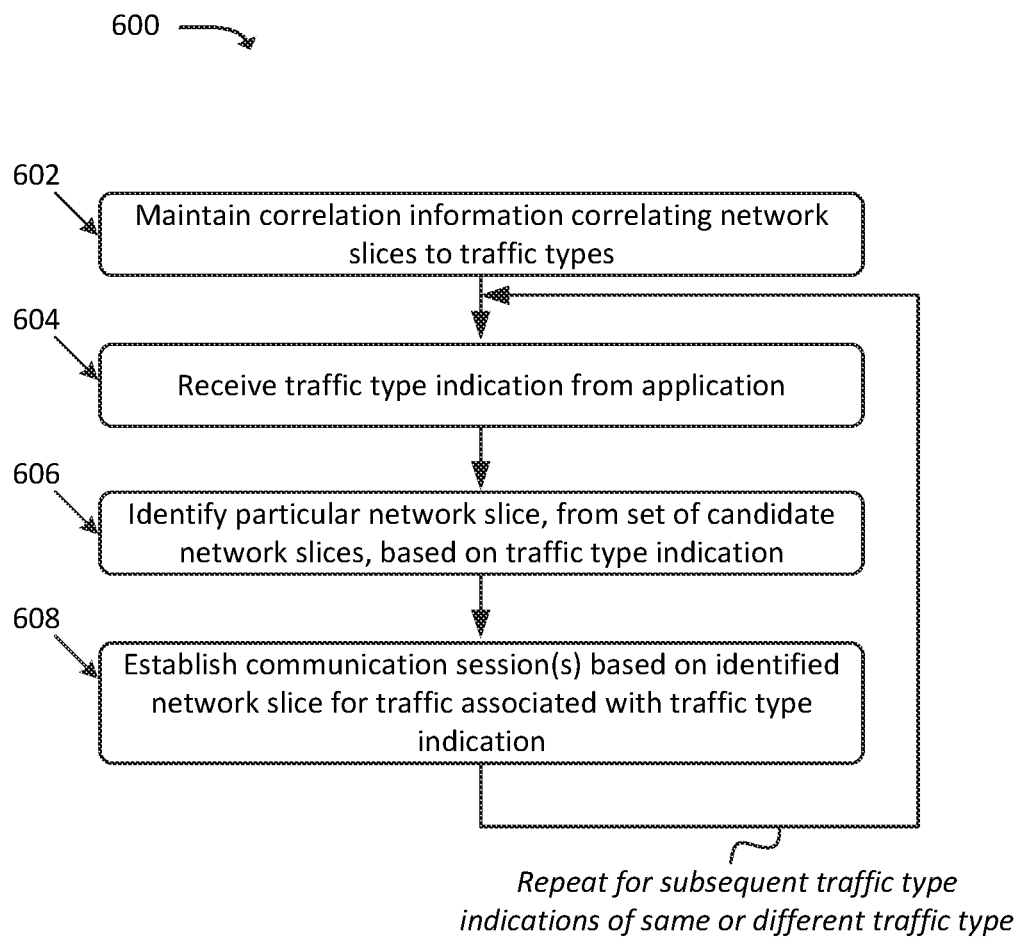
FIG. 6 illustrates an example process for establishing one or more discrete communication sessions associated with a particular multi-persona application, in accordance with some embodiments.

FIG. 6 illustrates an example process 600 for establishing one or more discrete communication sessions associated with a particular multi-persona application 103, in accordance with one or more embodiments. As described above, such communication sessions may include QoS flows, DRBs, PDU sessions, backhaul links, and/or one or more other suitable type of communication session with QoS parameters that are associated with particular traffic types. In some embodiments, some or all of process 600 may be performed by UE 101 (e.g., by network interface 307 and/or some other component of UE 101). In some embodiments, one or more other devices may perform some or all of process 600 (e.g., in concert with, and/or in lieu of, UE 101).

As shown, process 600 may include maintaining (at 602) correlation information that correlates a set of network slices to a set of traffic types. For example, as described above, network interface 307 may maintain information that correlates categories, names, and/or other identifiers of traffic types to slices of a wireless network. As mentioned above, a network slice may refer to a discrete set of devices or systems of the network, and/or to a discrete set of QoS parameters provided to traffic associated with a given network slice. For example, traffic associated with a "voice call" slice may be associated with QoS parameters whereby such traffic receives higher queue weights, lower latency, etc. than traffic associated with a "file transfer" slice. As another example, traffic associated with a "first responder" slice may be associated with QoS parameters whereby such traffic receives higher queue weights, lower latency, etc. than traffic not associated with the "first responder" slice. Network interface 307 may receive such information from an operator of the wireless network, such as during an initial provisioning process, an OTA update, etc. In some embodiments, correlations between particular network slices and particular traffic types may be set automatically using machine learning or other suitable techniques. In this manner, the operator of the network may have control over which traffic types receive which particular QoS treatment.

Process 600 may further include receiving (at 604) a traffic type indication from an application executing at UE 101 (e.g., multi-persona application 103). As noted above, UE 101 may execute one or more multi-persona applications 103, which may send and/or receive traffic for which different levels of QoS treatment may be appropriate. Providing differing levels of QoS treatment may ensure a user experience commensurate with different types of traffic or services, without expending excess network resources to provide such QoS treatment for all traffic associated with the application. The traffic type indication may be received (at 604) as part of an initialization process and/or in conjunction with traffic (e.g., user plane traffic) to be output from multi-persona application 103 to another device or system via one or more networks. For example, multi-persona application 103 may output a request that indicates the traffic type, and/or may include an identifier of the traffic type as header information or other suitable information with the traffic to be output from UE 101.

Process 600 may additionally include identifying (at 606) a particular network slice, out of a set of candidate network slices, with which the traffic type indication is associated. For example, network interface 307 may utilize the correlation information, between different network slices and traffic types, to identify which particular network slice is associated with the traffic type indicated in the traffic type indication.

Process 600 may further include establishing (at 608) one or more communication sessions with a network based on the network slice associated with the traffic type indicated in the traffic type indication. For example, as described above, network interface 307 may determine whether any active communication sessions (e.g., QoS flows, DRBs, PDU sessions, etc.), which are associated with the network slice, are already established between UE 101 and RAN 301 (e.g., base station 401), and/or between UE 101 and core network 303 (e.g., UPF 403). For example, such communication sessions may have been previously established for previous traffic of the same type from the same multi-persona application 103, for previous traffic of the same type from another application (e.g., another multi-persona application 103), and/or has been previously established for some other reason. In the event that a communication session associated with the identified network slice has been previously established, network interface 307 may output traffic associated with the traffic type indication via such previously established communication session. In some embodiments, network interface 307 may add slice and/or QoS information, such as header information including an NSSAI value and/or a QFI value, to the traffic. Such header information may be included at various layers, such as a Service Data Adaptation Protocol ("SDAP") layer, a network layer, and/or other suitable layer.

In the event that a QoS flow, DRB, PDU session, and/or other suitable type of communication session associated with the identified network slice has not been established between UE 101 and RAN 301 or core network 303, network interface 307 may initiate or request the establishment of one or more communication sessions associated with the particular network slice. For example, as described above, UE 101 may communicate with RAN 301 to establish a QoS flow and/or a DRB between UE 101 and RAN 301, and/or may communicate with core network 303 to establish a QoS flow and/or PDU session between UE 101 and core network 303 (e.g., UPF 403). As described above, network interface 307 may utilize multiple IP addresses or other network endpoint identifiers, where each IP address is associated with a different traffic type and network slice. As another example, network interface 307 may utilize the same IP address or other network endpoint identifier for multiple network slices. In such an example, traffic associated with different network slices may include QFI values or other suitable values based on the respective network slices associated with such traffic.

As also discussed above RAN 301 and core network 303 may establish or identify one or more backhaul links associated with particular network slices, and use such backhaul links to carry traffic between RAN 301 and core network 303 according to QoS parameters associated with such network slices. Such backhaul links may include GTP-U tunnels, an N3 interface, or other suitable communication pathways. In this manner, end-to-end QoS parameters may be enforced at multiple layers and at multiple segments of the wireless network.

Some or all of process 600 may be performed iteratively for subsequent traffic type indications, which may be associated with the same or a different traffic type indicated (at 604) by multi-persona application 103. For example, network interface 307 may receive a traffic type indication associated with a different traffic type from the same multi-persona application 103, and may establish (at 608) one or more additional communication sessions, QoS flows, etc. based on a network slice associated with the different traffic type. As another example, network interface 307 may receive a traffic type indication associated with a different traffic type from a different application (e.g., a different multi-persona application 103 or other type of application), and may establish (at 608) one or more additional communication sessions, QoS flows, etc. based on a network slice associated with the different traffic type. As yet another example, network interface 307 may receive a traffic type indication associated with the traffic type (e.g., from the same multi-persona application 103, a different multi-persona application 103, and/or another type of application) and may utilize a previously established communication session, QoS flow, etc. that is associated with a network slice associated with the same traffic type.

Figure 7:
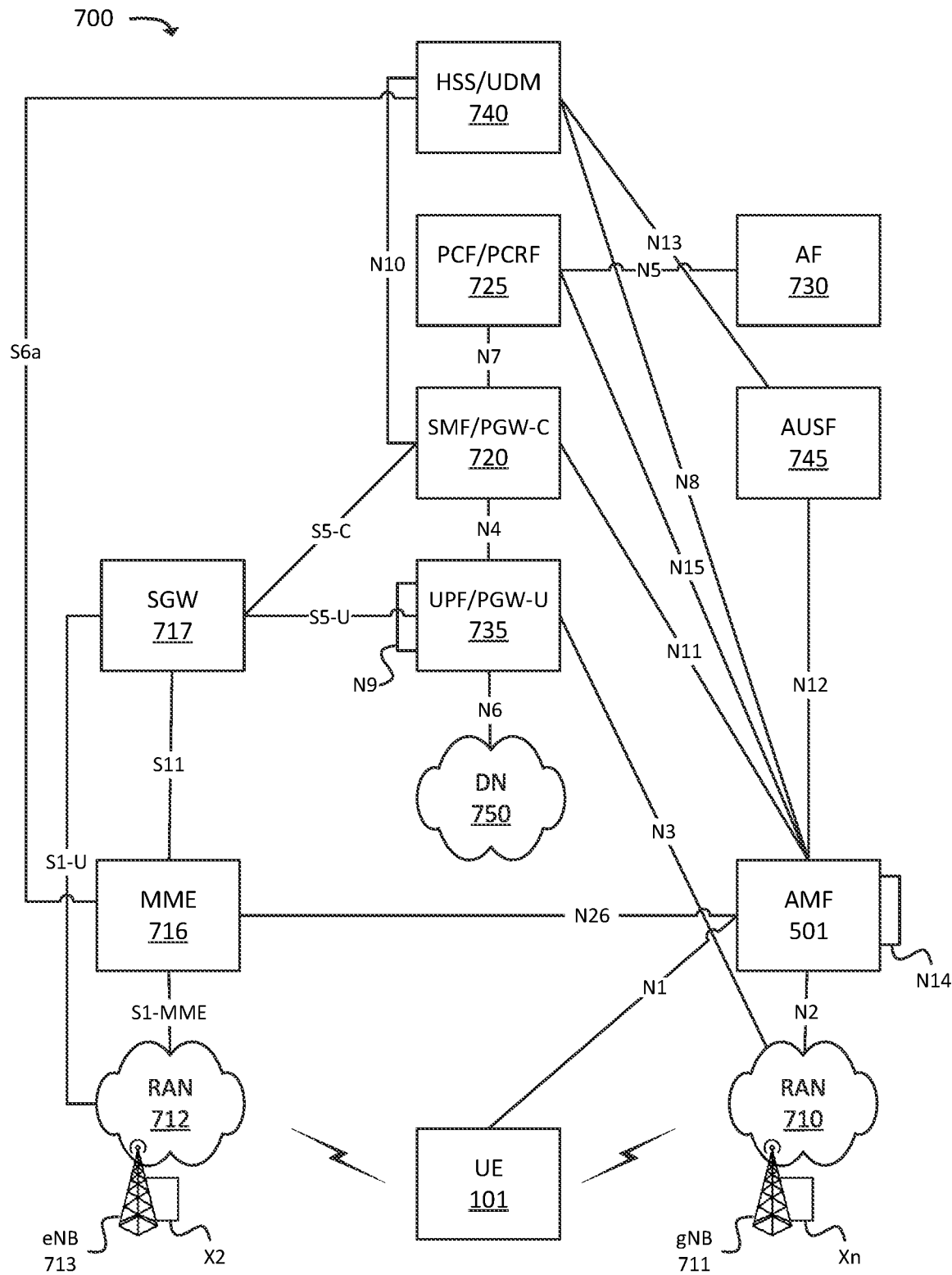
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 101, RAN 710 (which may include one or more Next Generation Node Bs ("gNBs") 711), RAN 712 (which may include one or more one or more evolved Node Bs ("eNBs") 713), and various network functions such as AMF 501, Mobility Management Entity ("MME") 716, Serving Gateway ("SGW") 717, Session Management Function ("SMF")/Packet Data Network ("PDN") Gateway ("PGW")-Control plane function ("PGW-C") 720, PCF/Policy Charging and Rules Function ("PCRF") 725, Application Function ("AF") 730, UPF/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750.

The example shown in FIG. 7 illustrates one instance of each network component or function (e.g., one instance of SMF/PGW-C 720, PCF/PCRF 725, UPF/PGW-U 735, HSS/UDM 740, and/or AUSF 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or AUSF 745, while another slice may include a second instance of SMF/PGW-C 720, PCF/PCRF 725, UPF/PGW-U 735, HSS/UDM 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700.

Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 101 may include a computation and communication device, such as a wireless mobile communication device that is capable of communicating with RAN 710, RAN 712, and/or DN 750. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 101 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 101 may communicate with one or more other elements of environment 700. UE 101 may communicate with RAN 710 via an air interface (e.g., as provided by gNB 711). For instance, RAN 710 may receive traffic (e.g., voice call traffic, data traffic, messaging traffic, signaling traffic, etc.) from UE 101 via the air interface, and may communicate the traffic to UPF/PGW-U 735, and/or one or more other devices or networks. Similarly, RAN 710 may receive traffic intended for UE 101 (e.g., from UPF/PGW-U 735, AMF 501, and/or one or more other devices or networks) and may communicate the traffic to UE 101 via the air interface. In some embodiments, base station 401 may be, may include, and/or may be implemented by one or more gNBs 711.

RAN 712 may be, or may include, a LTE RAN that includes one or more base stations (e.g., one or more eNBs 713), via which UE 101 may communicate with one or more other elements of environment 700. UE 101 may communicate with RAN 712 via an air interface (e.g., as provided by eNB 713). For instance, RAN 710 may receive traffic (e.g., voice call traffic, data traffic, messaging traffic, signaling traffic, etc.) from UE 101 via the air interface, and may communicate the traffic to UPF/PGW-U 735, and/or one or more other devices or networks. Similarly, RAN 710 may receive traffic intended for UE 101 (e.g., from UPF/PGW-U 735, SGW 717, and/or one or more other devices or networks) and may communicate the traffic to UE 101 via the air interface. In some embodiments, base station 401 may be, may include, and/or may be implemented by one or more eNBs 713.

AMF 501 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 710 and/or gNBs 711, and/or to perform other operations. In some embodiments, the 5G network may include multiple AMFs 501, which communicate with each other via the N14 interface (denoted in FIG. 7 by the line marked "N14" originating and terminating at AMF 501).

MME 716 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate the establishment of communication sessions on behalf of UE 101. In some embodiments, the establishment of communications sessions may be performed in accordance with one or more policies provided by PCF/PCRF 725. In some embodiments, SMF/PGW-C 720 may include, may implement, may be implemented by, and/or may be communicatively coupled to SMF 503.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725). In some embodiments, PCF/PCRF 725 may include, may implement, may be implemented by, and/or may be communicatively coupled to PCF 505.

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 101, from DN 750, and may forward the user plane data toward UE 101 (e.g., via RAN 710, SMF/PGW-C 720, and/or one or more other devices). In some embodiments, multiple UPFs 735 may be deployed (e.g., in different geographical locations), and the delivery of content to UE 101 may be coordinated via the N9 interface (e.g., as denoted in FIG. 7 by the line marked "N9" originating and terminating at UPF/PGW-U 735). Similarly, UPF/PGW-U 735 may receive traffic from UE 101 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735. In some embodiments, UPF/PGW-U 735 may include, may implement, may be implemented by, and/or may be communicatively coupled to UPF 403.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 101.

DN 750 may include one or more wired and/or wireless networks. For example, DN 750 may include an IP-based PDN, a wide area network ("WAN") such as the Internet, a private enterprise network, and/or one or more other networks. UE 101 may communicate, through DN 750, with data servers, other UEs 101, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 101 may communicate.

Figure 8:
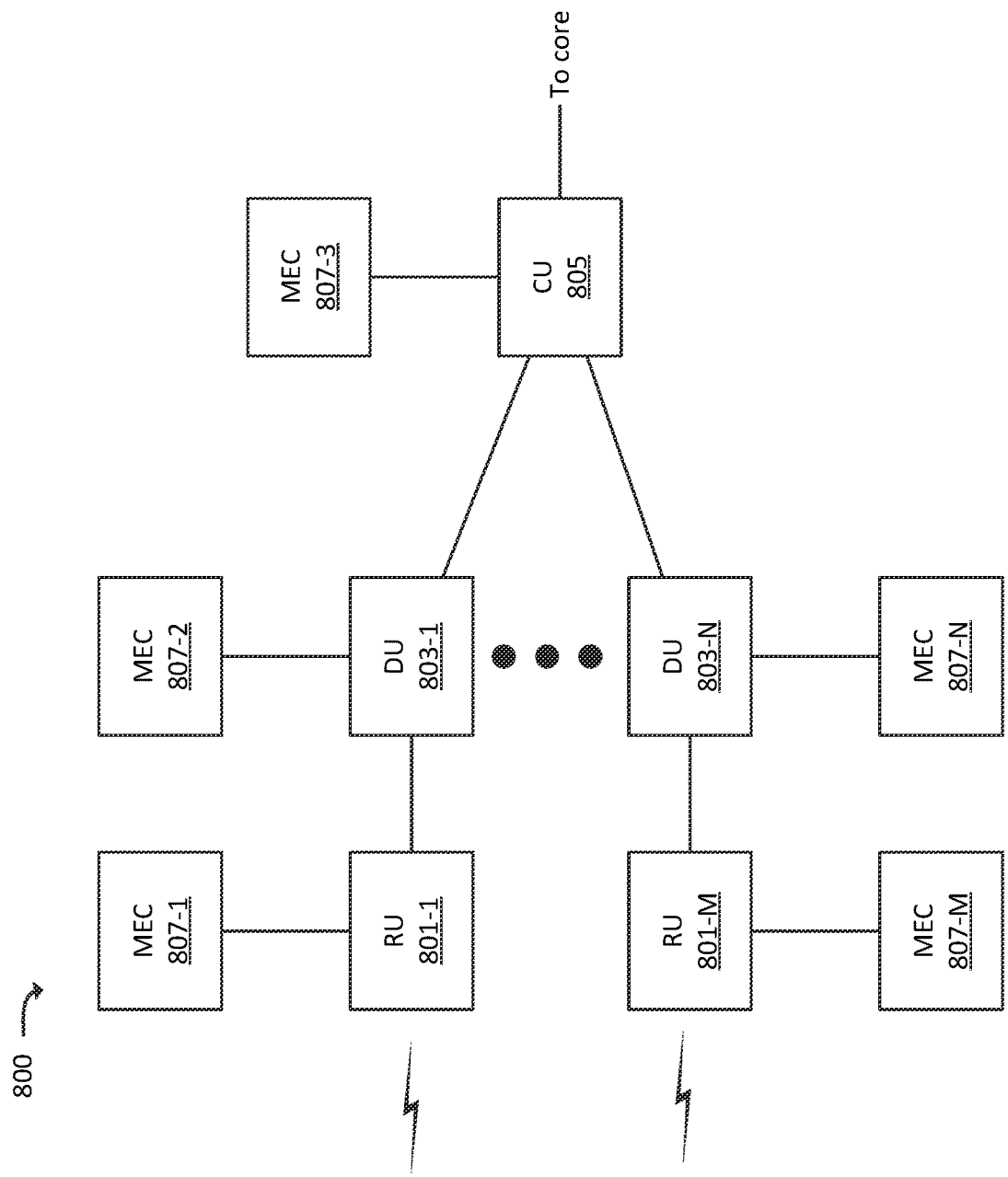
FIG. 8 illustrates an example arrangement of a RAN, in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 501 and/or UPF/PGW-U 735). In the uplink direction (e.g., for traffic from UEs 101 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 101, and may determine which DU(s) 803 should receive the downlink traffic. DU 803 may include one or more devices that transmit traffic between a core network (e.g., via CU 805) and UE 101 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 101.

RU 801 may include hardware circuitry (e.g., one or more RF transceivers, antennas, radios, and/or other suitable hardware) to communicate wirelessly (e.g., via an RF interface) with one or more UEs 101, one or more other DUs 803 (e.g., via RUs 801 associated with DUs 803), and/or any other suitable type of device. In the uplink direction, RU 801 may receive traffic from UE 101 and/or another DU 803 via the RF interface and may provide the traffic to DU 803. In the downlink direction, RU 801 may receive traffic from DU 803, and may provide the traffic to UE 101 and/or another DU 803.

RUs 801 may, in some embodiments, be communicatively coupled to one or more Multi-Access/Mobile Edge Computing ("MEC") devices, referred to sometimes herein simply as "MECs" 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 101, via a respective RU 801.

For example, RU 801-1 may route some traffic, from UE 101, to MEC 807-1 instead of to a core network (e.g., via DU 803 and CU 805). MEC 807-1 may process the traffic, perform one or more computations based on the received traffic, and may provide traffic to UE 101 via RU 801-1. In this manner, ultra-low latency services may be provided to UE 101, as traffic does not need to traverse DU 803, CU 805, and an intervening backhaul network between DU network 800 and the core network. In some embodiments, MEC 807 may include, and/or may implement, one or more of the operations described above with respect to base station 401.

Figure 9:
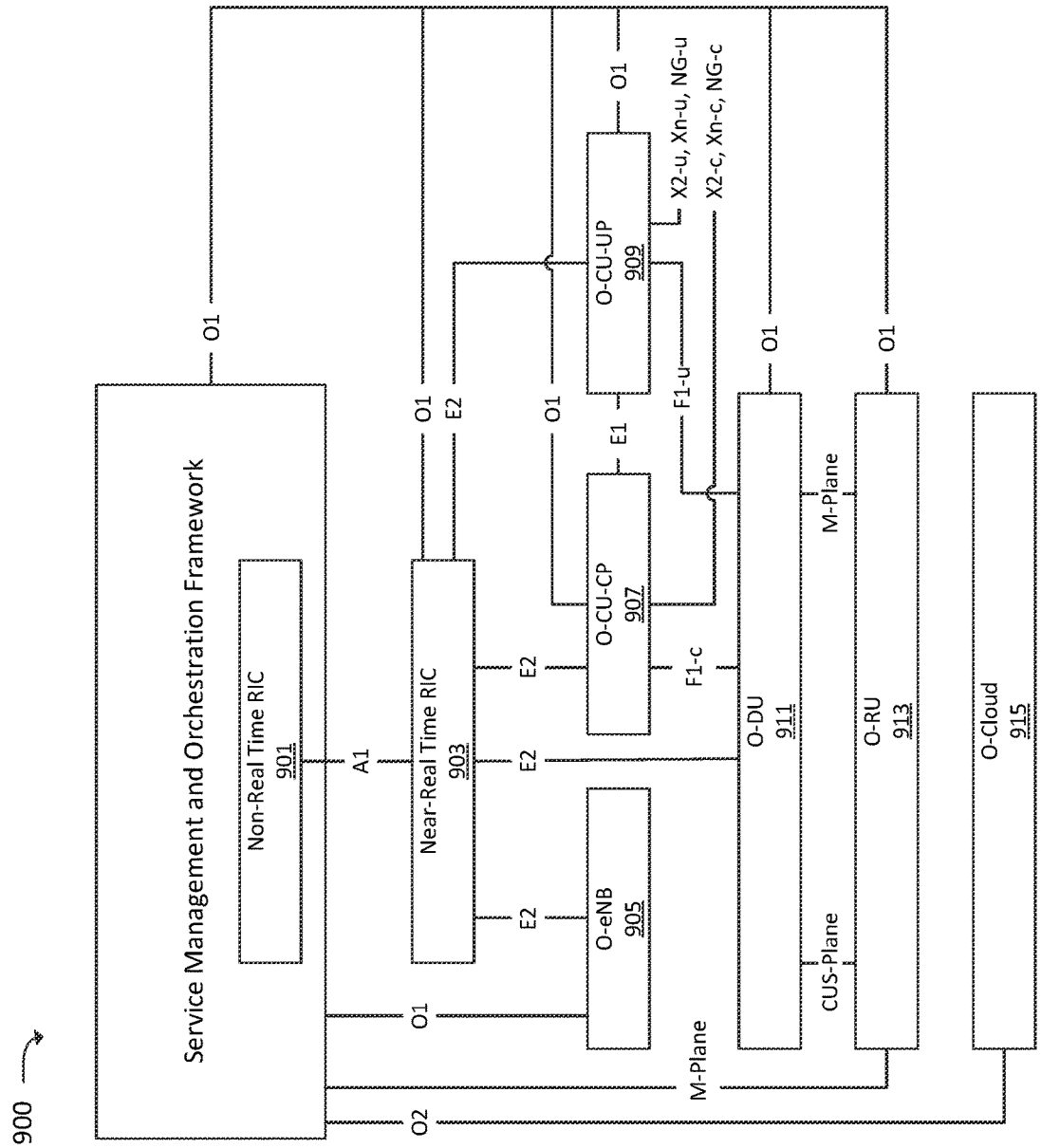
FIG. 9 illustrates an example arrangement of an Open RAN ("O-RAN") environment in which one or more embodiments, described herein, may be implemented.

FIG. 9 illustrates an example O-RAN environment 900, which may correspond to RAN 710, RAN 712, and/or DU network 800. For example, RAN 710, RAN 712, and/or DU network 800 may include one or more instances of O-RAN environment 900, and/or one or more instances of O-RAN environment 900 may implement RAN 710, RAN 712, DU network 800, and/or some portion thereof. As shown, O-RAN environment 900 may include Non-Real Time Radio Intelligent Controller ("RIC") 901, Near-Real Time RIC 903, O-eNB 905, O-CU-Control Plane ("O-CU-CP") 907, O-CU-User Plane ("O-CU-UP") 909, O-DU 911, O-RU 913, and O-Cloud 915. In some embodiments, O-RAN environment 900 may include additional, fewer, different, and/or differently arranged components.

In some embodiments, some or all of the elements of O-RAN environment 900 may be implemented by one or more configurable or provisionable resources, such as virtual machines, cloud computing systems, physical servers, and/or other types of configurable or provisionable resources. In some embodiments, some or all of O-RAN environment 900 may be implemented by, and/or communicatively coupled to, one or more MECs 807.

Non-Real Time RIC 901 and Near-Real Time RIC 903 may receive performance information (and/or other types of information) from one or more sources, and may configure other elements of O-RAN environment 900 based on such performance or other information. For example, Near-Real Time RIC 903 may receive performance information, via one or more E2 interfaces, from O-eNB 905, O-CU-CP 907, and/or O-CU-UP 909, and may modify parameters associated with O-eNB 905, O-CU-CP 907, and/or O-CU-UP 909 based on such performance information. Similarly, Non-Real Time RIC 901 may receive performance information associated with O-eNB 905, O-CU-CP 907, O-CU-UP 909, and/or one or more other elements of O-RAN environment 900 and may utilize machine learning and/or other higher level computing or processing to determine modifications to the configuration of O-eNB 905, O-CU-CP 907, O-CU-UP 909, and/or other elements of O-RAN environment 900. In some embodiments, Non-Real Time RIC 901 may generate machine learning models based on performance information associated with O-RAN environment 900 or other sources, and may provide such models to Near-Real Time RIC 903 for implementation.

O-eNB 905 may perform functions similar to those described above with respect to eNB 713. For example, O-eNB 905 may facilitate wireless communications between UE 101 and a core network. O-CU-CP 907 may perform control plane signaling to coordinate the aggregation and/or distribution of traffic via one or more DUs 803, which may include and/or be implemented by one or more O-DUs 911, and O-CU-UP 909 may perform the aggregation and/or distribution of traffic via such DUs 803 (e.g., O-DUs 911). O-DU 911 may be communicatively coupled to one or more RUs 801, which may include and/or may be implemented by one or more O-RUs 913. In some embodiments, O-Cloud 915 may include or be implemented by one or more MECs 807, which may provide services, and may be communicatively coupled, to O-CU-CP 907, O-CU-UP 909, O-DU 911, and/or O-RU 913 (e.g., via an O1 and/or O2 interface).

Figure 10:
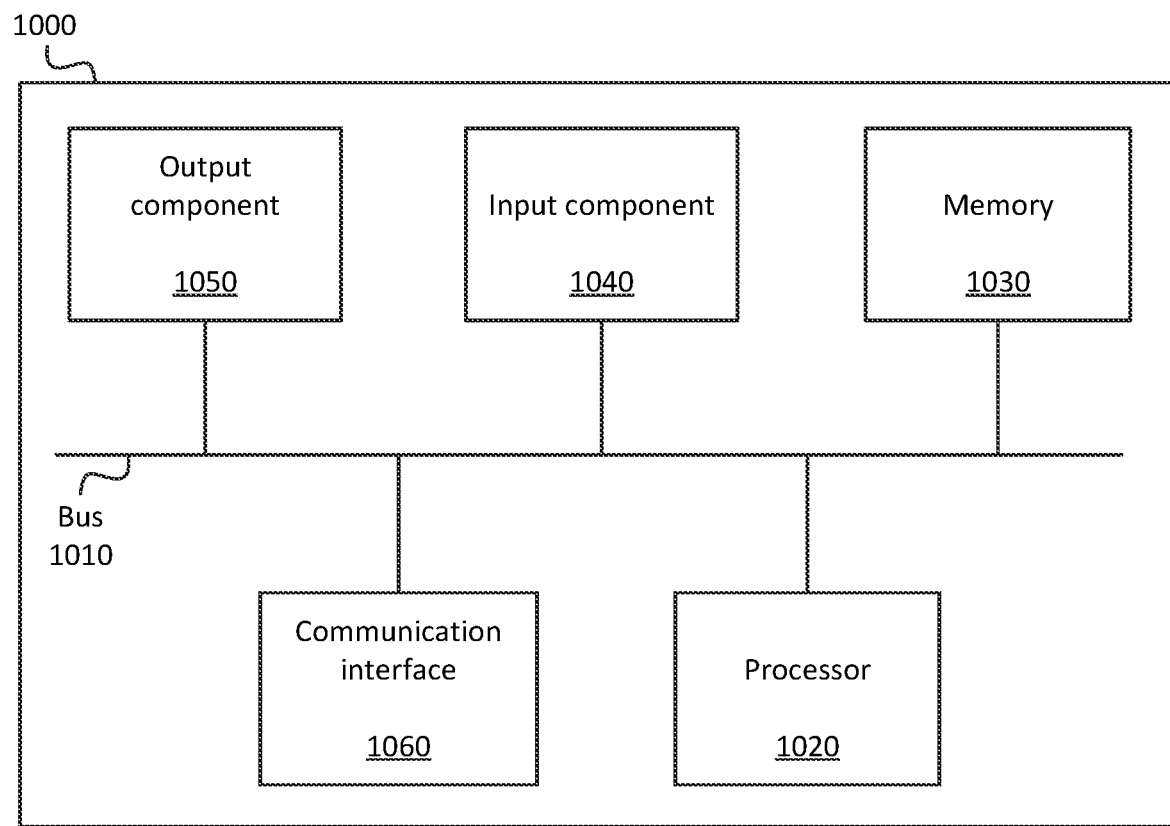
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like.

Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6) the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain correlation information correlating a plurality of network slices to a plurality of traffic types, wherein the correlation information includes:
a first correlation between a first traffic type and a first network slice of the plurality of network slices, and
a second correlation between a second traffic type and a second network slice of the plurality of network slices;
receive a first traffic type indication from a first application executing at the device, the first traffic type indication indicating the first traffic type;
establish a first communication session with a network based on the first network slice associated with the first traffic type;
receive a second traffic type indication from the first application, the second traffic type indication indicating the second traffic type;
identify a second communication session that is associated with the second network slice and via which a second application, executing at the device, communicates with the network;

communicate traffic, associated with the first application and the first traffic type, to and from the network via the first communication session; and communicate, to and from the network via the second communication session, traffic that is associated with:
the second application, and
the first application and the second traffic type.

2. The device of claim 1, wherein the first and second communication sessions each include a respective Internet Protocol ("IP")-based communication session.

3. The device of claim 2, wherein the device is a first endpoint associated with a particular IP-based communication session, and wherein a network device of the core network is a second endpoint associated with the particular IP-based communication session.

4. The device of claim 2, wherein the particular IP-based communication session includes a Protocol Data Unit ("PDU") session.

5. The device of claim 1,
wherein establishing the first communication session includes establishing a first set of Quality of Service ("QoS") flows via a particular protocol data unit ("PDU") session, and
wherein establishing the second communication session includes establishing a second set of QoS flows via the same particular PDU session.

6. A non-transitory computer-readable medium, storing a plurality of processor-executable instructions to:
maintain correlation information correlating a plurality of network slices to a plurality of traffic types, wherein the correlation information includes:
a first correlation between a first traffic type and a first network slice of the plurality of network slices, and
a second correlation between a second traffic type and a second network slice of the plurality of network slices;
receive a first traffic type indication from a first application executing at a device, the first traffic type indication indicating the first traffic type;
establish a first communication session between the device and a network based on the first network slice associated with the first traffic type;
receive a second traffic type indication from the first application, the second traffic type indication indicating the second traffic type;
identify a second communication session that is associated with the second network slice and via which a second application, executing at the device, communicates with the network;
communicate traffic, associated with the first application and the first traffic type, to and from the network via the first communication session; and
communicate, to and from the network via the second communication session, traffic that is associated with:
the second application, and
the first application and the second traffic type.

7. The non-transitory computer-readable medium of claim 6, wherein the first communication session includes an Internet Protocol ("IP")-based communication session, wherein the device is a first endpoint associated with the IP-based communication session, and wherein a network device of the core network is a second endpoint associated with the IP-based communication session.

8. The non-transitory computer-readable medium of claim 6, wherein the first communication session includes a first Quality of Service ("QoS") flow associated with a particular Protocol Data Unit ("PDU") session, and wherein the second communication session includes a second QoS flow associated with the same particular PDU session.

9. The non-transitory computer-readable medium of claim 6, wherein the first communication session includes at least one of:
a wireless communication session, associated with the first network slice, between the device and a Radio Access Network ("RAN"), or
a backhaul communication session, associated with the first network slice, between the RAN and a core network.

10. The non-transitory computer-readable medium of claim 6,
wherein establishing the first communication session includes establishing a first set of Quality of Service ("QoS") flows via a particular protocol data unit ("PDU") session, and
wherein establishing the second communication session includes establishing second set of QoS flows via the same particular PDU session.

11. A method, comprising:
maintaining correlation information correlating a plurality of network slices to a plurality of traffic types, wherein the correlation information includes:
a first correlation between a first traffic type and a first network slice of the plurality of network slices, and
a second correlation between a second traffic type and a second network slice of the plurality of network slices;
receiving a first traffic type indication from a first application executing at a device, the first traffic type indication indicating the first traffic type;
establishing a first communication session between the device and a network based on the first network slice associated with the first traffic type;
receiving a second traffic type indication from the first application, the second traffic type indication indicating the second traffic type;
identifying a second communication session that is associated with the second network slice and via which a second application, executing at the device, communicates with the network;
communicating traffic, associated with the first application and the first traffic type, to and from the network via the first communication session; and
communicating traffic, associated with the first and second applications and the second traffic type, to and from the network via the second communication session.

12. The method of claim 11, wherein the first communication session includes an Internet Protocol ("IP")-based communication session, wherein the device is a first endpoint associated with the IP-based communication session, and wherein a network device of the core network is a second endpoint associated with the IP-based communication session.

13. The method of claim 11, wherein the first communication session includes at least one of:
a wireless communication session, associated with the first network slice, between the device and a Radio Access Network ("RAN"), or
a backhaul communication session, associated with the first network slice, between the RAN and a core network.

14. The method of claim 11,
wherein establishing the first communication session includes establishing a first set of Quality of Service ("QoS") flows via a particular protocol data unit ("PDU") session, and
wherein establishing the second communication session includes establishing a second set of QoS flows via the same particular PDU session.

15. The method of claim 11,
wherein the application is associated with a first endpoint identifier associated with the first communication session, and
wherein the application is associated with a second endpoint identifier associated with the second communication session.

16. The method of claim 15, wherein the first endpoint identifier includes a first Internet Protocol ("IP") address, and wherein the second endpoint identifier includes a second IP address.

17. The device of claim 1,
wherein the application is associated with a first endpoint identifier associated with the first communication session, and
wherein the application is associated with a second endpoint identifier associated with the second communication session.

18. The device of claim 17, wherein the first endpoint identifier includes a first Internet Protocol ("IP") address, and wherein the second endpoint identifier includes a second IP address.

19. The non-transitory computer-readable medium of claim 6,
wherein the application is associated with a first endpoint identifier associated with the first communication session, and
wherein the application is associated with a second endpoint identifier associated with the second communication session.

20. The non-transitory computer-readable medium of claim 19, wherein the first endpoint identifier includes a first Internet Protocol ("IP") address, and wherein the second endpoint identifier includes a second IP address.

\* \* \* \* \*